W. E. BATES.
Wheel-Cultivator.
No. 47,693. Patented May 16, 1865.
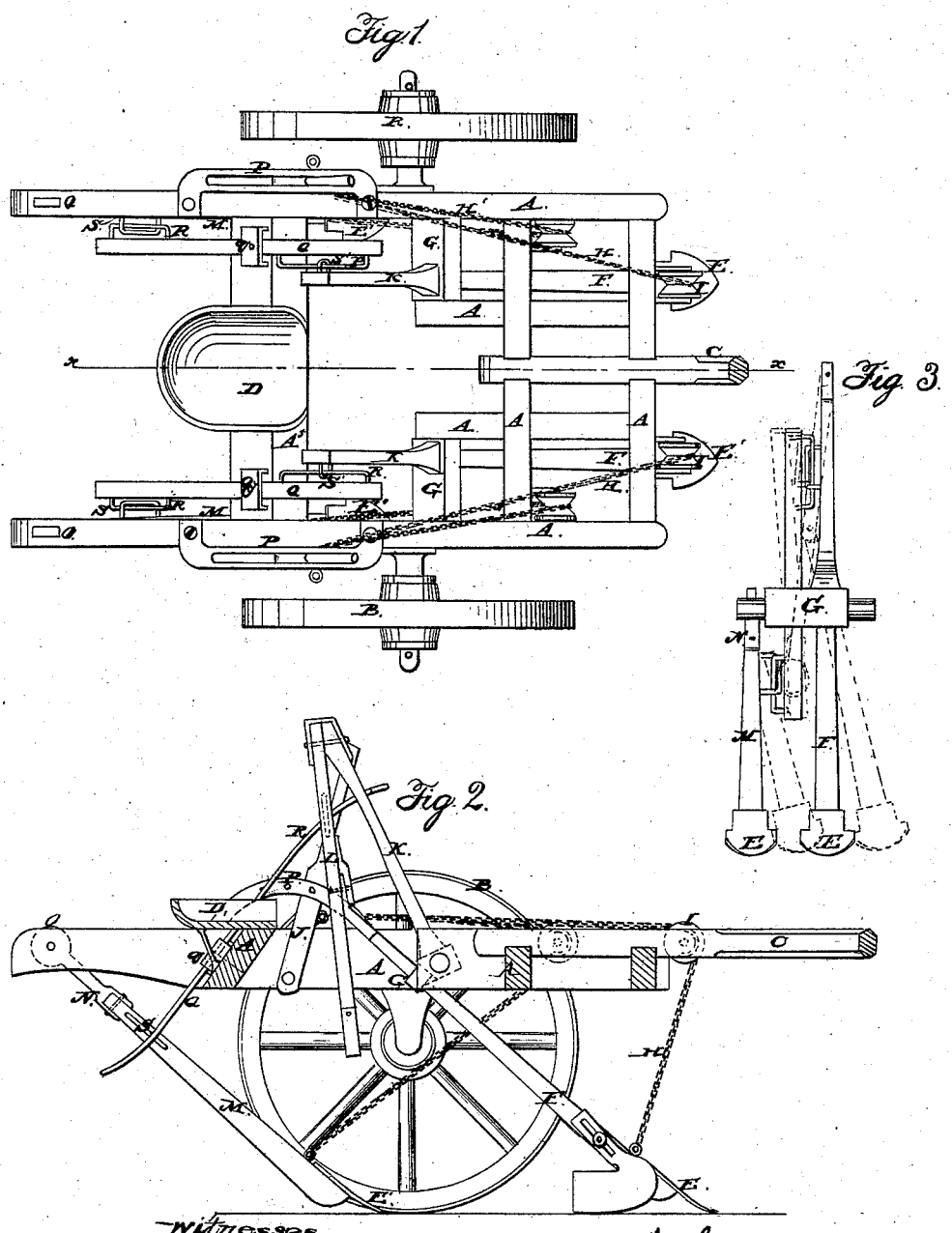

UNITED STATES PATENT OFFICE.

WILLIAM E. BATES, OF ELMORE, ILLINOIS.

IMPROVEMENT IN CULTIVATORS.

Specification forming part of Letters Patent No. 47,693, dated May 16, 1865.

*To all whom it may concern:*

Be it known that I, WILLIAM E. BATES, of Elmore, in the county of Peoria and State of Illinois, have invented a new and useful Improvement in Cultivators; and I do hereby declare the following to be a full and exact description of the same, reference being had to the accompanying drawings, making part of this specification, in which—

Figure 1 is a plan of a cultivator embodying my invention. Fig. 2 is a vertical longitudinal section of the same in the line $x$ $x$, Fig. 1. Fig. 3 is a detached view illustrative of the method of shifting the shovels laterally to avoid uprooting plants or coming in contact with obstacles.

Similar letters of reference indicate corresponding parts in the several figures.

This cultivator appertains to the class in which the shovels are arranged to work two at each side of the corn or other plants.

The improvement consists in a novel method of suspending the shovels and shifting them laterally to prevent the uprooting of plants and to enable them to avoid immovable objects.

To enable others skilled in the art to which my invention appertains to fully understand and use the same, I will proceed to describe its construction and operation.

In the accompanying drawings, A represents the several parts of the main frame of a cultivator, B B the wheels, C the tongue, and D the driver's seat, to which parts no specific descriptive reference need be made hereinafter, there being nothing peculiar in their construction.

E E E′ E′ represent the plows or shovels, working in pairs at each side of the row, one shovel running behind the other in each pair, as usual. The standards F F of the forward shovels, E E, are attached respectively by bolts to blocks or pieces G, whose ends are journaled in the main frame A in such manner as to allow them to turn freely, and they thus constitute the axes of vertical vibration of the standards when, by means of the chains H passing over pulleys I to the hand-levers J, the said shovel-standards are raised.

From the blocks G rise standards K, and to the upper end of these latter are suspended pivoted stirrup bars or levers L, by which the lateral motion of the plows is attained.

The rear plows are attached to standards M, which are pivoted to clevises N, which latter are pivoted in the rear of the frame of the machine at O. By means of this double-pivoted bearing the vertical as well as the lateral adjustability of the rear plows is secured, the vertical motion being given by chains H′, connected to the same lever by which the forward shovels are raised, as has been described. The required vertical height of the plows being attained, the lever J is secured by a pin, which passes through holes in the segment guide-plate P, restraining the lever J from further forward vibration.

Q Q are swinging levers, pivoted at $q$ to the transverse bar $A^5$ of the machine, and have bows R, which engage with stirrup-rods S, attached to the standards M, and to stirrup-rods S′, attached to the suspended bars or levers L, at the lower end of each of which latter are stirrups for the feet of the driver, who sits in the seat D. It will be seen that the swinging bars are pivoted to the rear standards, M, below their point of vibration, and to the forward standards, F, above their point of vibration, so that the swinging of each of the bars Q on its center has the effect of throwing the shovels with which it is connected in the same direction toward or from the corn, according as the pressure of the foot in the stirrup is to the right or left. This arrangement is duplicated, the sets of shovels and operative levers, &c., on each side of the machine being entirely independent of those on the other side, and brought to bear in the balk on each side of the corn-row by means of the levers for vertical movement to regulate depth or withdraw the shovels from the soil, and by means of the suspended stirrup-bars to deflect the plows laterally, to work fairly up to the row, to accommodate the machine to the sinuosities, or to avoid obstacles by lateral adjustment.

Apart from the peculiarities of the machine which I have described and shall presently particularly specify, I have not gone into a tedious description of the special framing or the insertion and relative sizes of the parts, and the operation of the machine has been incidentally spoken of as the relation of the parts was described. It may, however, be stated that the parts are so arranged that by the motion of the feet of the operator the shovels on either side are approached to or receded from the corn in the row, while the hands are free to guide the team or operate the levers as occasion may require, and the two shovels on a side move simultaneously and in the same direction. It will be recollected by one who is expert in this department of industry that the second plow, which is farthest from the corn, is only a tender upon the first, and its object is to widen the strip of ground tilled by the tool.

The invention the subject of this specification is equivalent to two double-shovel plows, acting one on each side of the row of corn, and the prevalence of devices for implements of this kind arises from the desire to cultivate a large breadth of ground with a small force of hands, while the use of the double shovel in preference to the bar-share, diamond, or single-shovel plow arises from a growing conviction that the level system of farming is the best, especially in the arid atmosphere which has of late years been so prevalent in our summer drought.

I am aware that I am not the first to endeavor to meet this demand; but I claim for my implement a facile, effective, and economical character which renders it peculiarly adapted to the requirements of the case.

Having thus fully described the nature, construction, and operation of my invention, what I claim herein as new, and desire to secure by Letters Patent, is—

The swinging levers Q Q, connected, substantially as described, with the forward and rear shovel-standards, which are pivoted in such relation to the frame and laterally-moving mechanism that the two shovels thus connected are caused by the action of the treadle to approach to or recede from the corn in concert, as described and represented.

The above specification of my improvement in cultivators signed this 20th day of February, 1865.

WILLIAM E. BATES.

Witnesses:
   G. P. WYCOFF,
   G. D. SLYGH.